May 14, 1963    G. SZÖTS ETAL    3,089,226
METHOD FOR THE MANUFACTURE OF HEAT EXCHANGERS
Filed June 29, 1959    6 Sheets-Sheet 1

INVENTORS
GÉZA SZÖTS, FERENC SZETEY,
MIKLÓS KOCSIS, IMRE KONDOR,
FERENC HAVASI, ENDRE RITTER,
BÉLA DEMETER, ERNŐ GULYAS.
AND LAJOS BITTER
By Irwin A. Thompson
ATTY.

May 14, 1963 G. SZÖTS ETAL 3,089,226
METHOD FOR THE MANUFACTURE OF HEAT EXCHANGERS
Filed June 29, 1959 6 Sheets-Sheet 2

INVENTORS
GÉZA SZÖTS, FERENC SZETE,
MIKLÓS KOCSIS, IMRE KONDOR,
FERENC HAVASI, ENDRE RITTER,
BÉLA DEMETER, ERNŐ GULYÁS
& LAJOS BITTER
BY Irwin S. Thompson
ATTY.

May 14, 1963 G. SZÖTS ETAL 3,089,226
METHOD FOR THE MANUFACTURE OF HEAT EXCHANGERS
Filed June 29, 1959 6 Sheets-Sheet 3

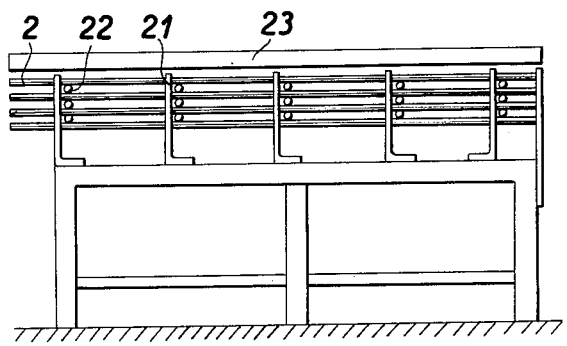
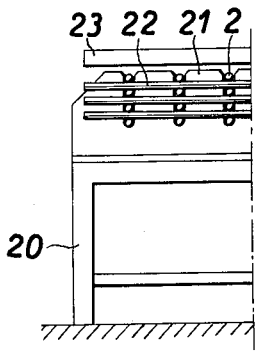
*Fig. 12*  *Fig. 13*
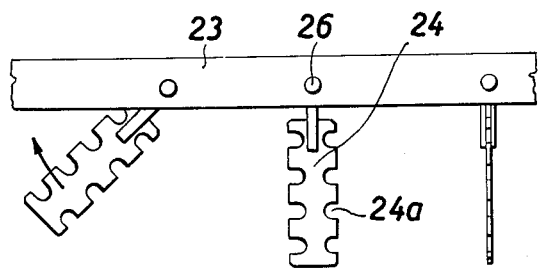
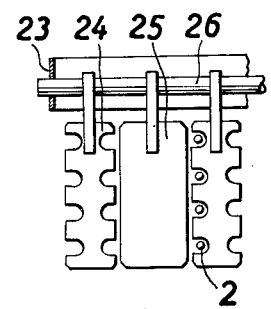
*Fig. 14*  *Fig. 15*
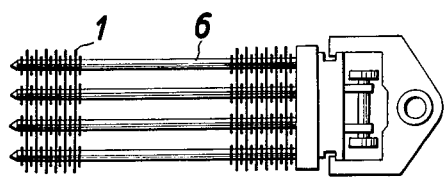
*Fig. 16*

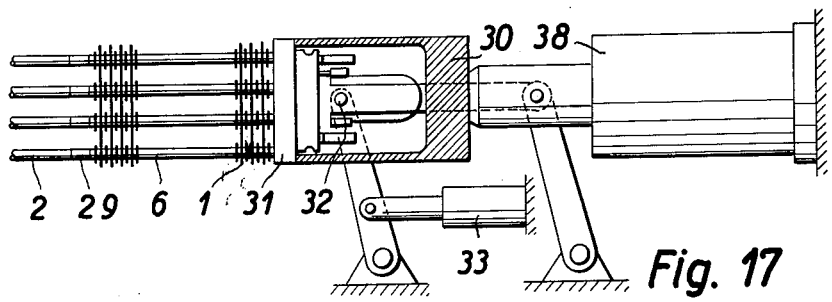
Fig. 17
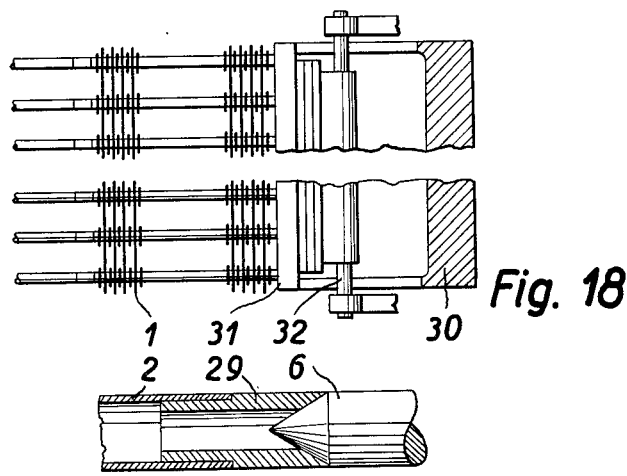
Fig. 18
Fig. 19
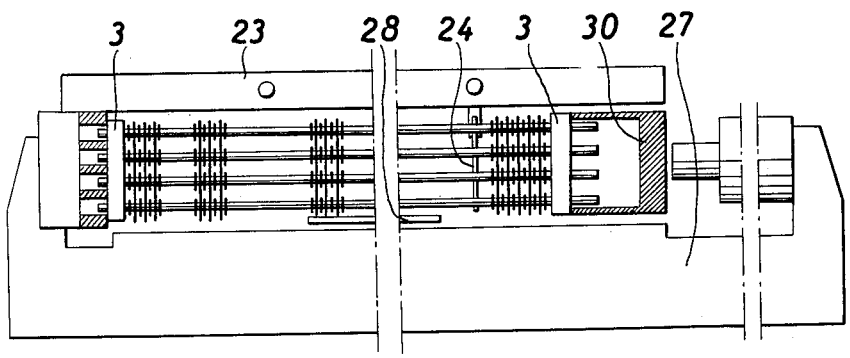
Fig. 20

United States Patent Office 3,089,226
Patented May 14, 1963

3,089,226
METHOD FOR THE MANUFACTURE OF HEAT EXCHANGERS
Géza Szöts, Ferenc Szetey, Miklós Kocsis, Imre Kondor, Ferenc Havasi, Endre Ritter, Béla Demeter, Ernö Gulyás, and Lajos Bitter, all of Budapest, Hungary, assignors to Altalanos Geptervezo Iroda, Budapest, Hungary, a firm
Filed June 29, 1959, Ser. No. 823,707
2 Claims. (Cl. 29—157.3)

High efficiency heat exchangers are known which consist essentially of a large number of parallel tubes and, connecting these, fins arranged vertically to the tubes in such a way that distance rings (spacing rings) are fitted between any two parallel fins, and that, in the interest of a good heat output, these components are in close communication with each other. As cooling installations, these heat exchangers are best built up of such components as consist of a large number of cooling fins between two end plates, and arranged in such a manner namely, that the cooling fins are split up into groups of 60–70 fins, with a stiffening plate being fitted between any two adjacent groups, the stiffening and end plates being in one single piece along the unit's entire length, whereas the cooling fins are split up into two parts, i.e. the length of each fin is equal to about half the length of the unit.

Such heat exchanger units consist of a very large number of constructional components; they contain for example, several hundred tubes, several thousand cooling fins, and a few hundred thousand distance rings, the majority of these components being chiefly thin-walled components which, as far as durability is concerned are weak and delicate. Obviously, the manufacture of these heat exchanger units is quite a difficult procedure. A very large number of heat exchanger units must be employed for supplying a thermal power installation of medium size.

The purpose of the invention is to provide a method enabling heat exchanger units of the kind described to be assembled in a large-scale manufacturing operation using, in the main, automatic machinery and ensuring the desired degree of accuracy and quality.

The method as per the invention consists of threading the cooling fins and spacing rings on to a mandrel, in a sequence corresponding to their final position, and of temporarily securing the tubes in their final, relative position with the aid of attaching components, and then of joining the thread-on mandrels complete with components threaded on same, to the tubes in one and the same line as the components, and of pushing the threaded-on components over the tubes, in the meantime removing the temporary attaching components in order of sequence, and, lastly, of finally securing to each other the heat exchanger's components thus assembled, in accordance with a working procedure well known of itself.

Thus, the method as per the invention comprises in substance, the following working operations:

(a) There is fitted to a vertical mandrel secured on a so-called charger, a stiffening plate and cooling fins of a number corresponding to the number in a group located between two stiffeners. Distance rings are fitted between the cooling fins. The mandrels are so arranged that the mutual relative position of the fins and the rings of each layer is the same as that which these components have to take up in the cooling unit.

(b) On a holder or base plate many tubes are temporarily secured in a horizontal position, as are intended to form a cooling element, so that the number of tubes corresponds to the number of mandrels located on a charger. The temporary securing is necessary because the tubes are so thin and of such long length that extremely severe bending might otherwise occur. A (bottom) end-plate limiting the cooling unit has to be fitted on the one end of the holder. To such a row of tubes there should naturally be allocated chargers in a number such as corresponds to the number of the group of cooling fins from which the cooling unit has to be assembled.

(c) the clamping components are conveyed to the tubes in order of sequence, and fitted so that the mandrels constitute an extension of the tubes. The cooling fins and the spacing rings are pushed on to the tubes by means of a hydraulic press. This is of course done at the tubes' free ends located opposite the end plate, so that the spacing rings and stiffening plates are pushed on simultaneously with the individual groups of fins. In the course of pushing on the groups of fins in order of sequence, the temporary holding and securing attachments have to be removed from the tubes in order of sequence, firstly because they would otherwise hinder the job of pushing on the cooling fins, and secondly, because at the places where the tubes are held by the fins, no special securing is in fact necessary. After all the cooling fins, stiffening plates and spacing rings have been pushed on, the other end plate has to be fitted.

(d) Then follows the—in itself quite well known—job of pressing together the parts, necessary to ensure a close contact. After pressing tight, the parts have to be secured in their compressed position, whereupon the job of widening the tubes takes place, a procedure also well known of itself. After having been widened, the tube ends are rolled into the bores in the end plates, whereupon the job of securing can be discontinued.

The drawings show a few examples of execution of the equipment necessary to put the method into effect. In these drawings:

FIGURES 12–15 represent the detail drawings of the attachments for temporarily securing the heat exchanger medium's tubes in their relative final position.

FIGURES 16–20 represent the equipment necessary for pushing the cooling fins and spacers over on to the tubes.

Figure 1:
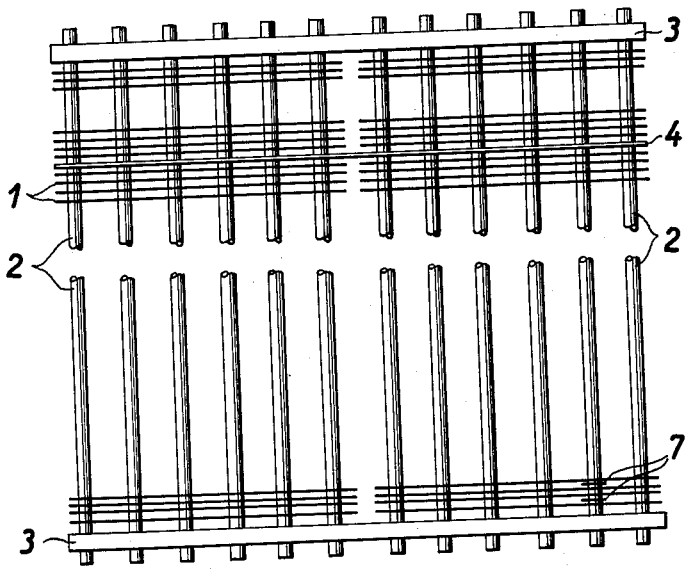
FIG. 1 shows a side view of the upper and lower portion of a cooling unit.

In FIG. 1 the two end plates are designated 3 and the securing plates between the individual groups of cooling fins are designated 4. It is obvious from the figure that the end plates and the securing plates are in one single piece whereas the cooling fins 1 are divided. Of the spacing rings 7 located between the cooling fins, only a few are illustrated in the drawing, though by the very nature of things there is one such ring 7 between every two adjacent fins and on each individual tube 2.

Figure 2:
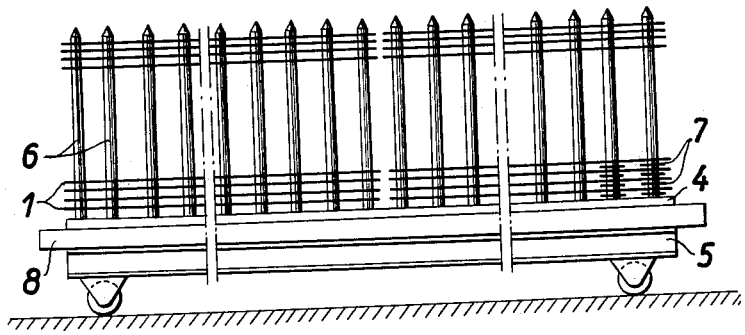
FIG. 2 represents the side view of a charger fitted with wheels and carrying the thread-on mandrels, FIGURES 3–9 contain the detail drawings of the various constructional components of the equipment for automatically fitting the spacing rings on the thread-on mandrels.
Figures 3, 4:
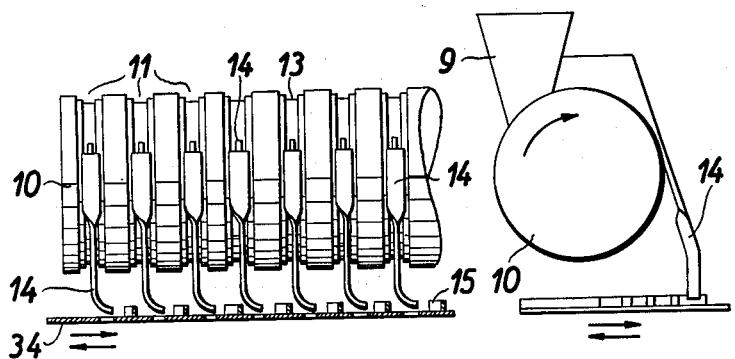
Figure 5:
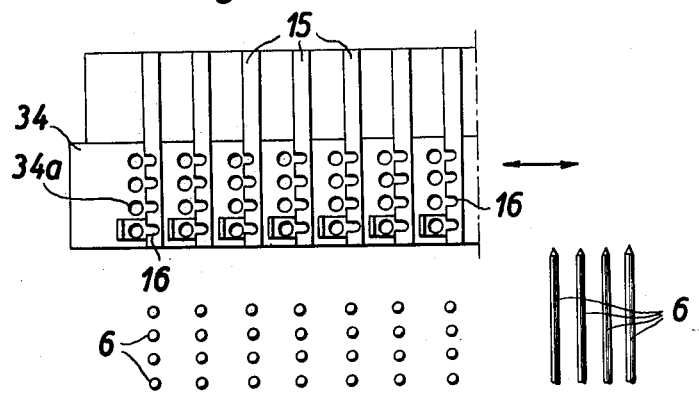
Figures 6, 7:
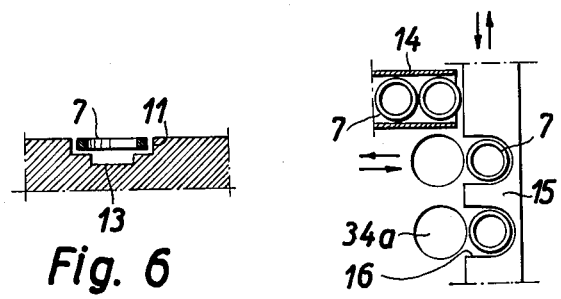
Figure 8:
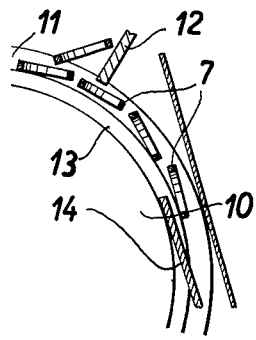
Figure 10:
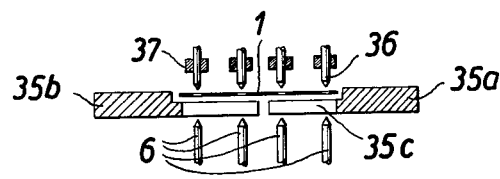
FIGURES 10–11 are the detail drawings of the equipment for automatically fitting the cooling fins on the thread-on mandrel.
Figure 11:
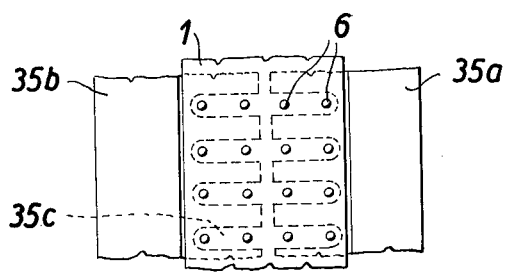

FIG. 2 represents the side view of a form of execution presented as an example of the charger necessary for the working operation (a) which runs on wheels and is of a trolley-like construction. Fitted on the mounting plate 8 secured to the chassis 5 are the mandrels 6 which, in a recommended form of execution of the invention, are arranged in four rows, with 40 mandrels per row, giving a total number of 160 mandrels. On these mandrels the fins 1 and the spacing rings 7 have to be placed. The fitting of the fins (FIGS. 10 and 11) and the pushing-on of the rings 7 (FIGURES 3–8) is performed by one and the same automatic machine. Electrical controls can be used to check that all the rings are in their correct position; a sketch drawing of a piece of equipment for this purpose can be seen in FIG. 9.

The working operation (a) will now be explained in detail in conjunction with FIGURES 1–11; the remaining figures will be explained later.

Fitting on the chassis 5 of the charger is the mounting plate 8 on which the stiffening plate is fitted, after which the bottom row of rings is fitted on the latter. This is done mechanically in such a way that the rings are tipped into the funnel 9 of the charging appliance as per FIGURES 3 and 4 from where they pass into the circular grooves 11 of the rotary drum 10. The number of slots corresponds to the number of mandrels 6 in a row of mandrels, and in the above example there are 40 of these grooves 11. Inside the funnel 9, above each single circular groove (FIG. 8) there is a straightening device 12 which, if needs be, can be constituted by the actual funnel walling, so that the rings 7 are consequently arranged next to one another in the grooves 11 when the drum 10 rotates. Each of the circular grooves 11 has a cavity 13 (see the section as per FIGURE 6 too) which is narrower than the rings and so the rings are unable to drop inside the cavity; by contrast there engages in the portion 13 of each circular groove a guide tang 14 which is extended into a channel-like shape and whose bent portion forms a slideway for the rings. By means of these slideways the rings are conveyed to the notches 16 of a batten 15 fitted contrariwise to them, the spacing between the notches 16 corresponding exactly to that of the mandrels 6. The battens are fitted movably in their longitudinal direction, i.e. vertical to the rows, the guideway necessary for this and the layout giving a to and fro movement too, not being shown in the drawing. If the batten as per FIG. 5 moves in the direction away from the observer, the cavities or recesses 16 make their way along the guideways 14 and so one ring 7 slips into each of them, in contrast to which, the batten, when it moves back, simply moves back along them. Between the battens 15 and the mandrels 6 is located the perforated plate 34 and, when the battens loaded with the rings reach their place, the rings are placed on the plate 34. Now, if this plate is shifted in such a way that all its apertures 34a come to lie above a mandrel, the rings will drop out of the recesses 16 and in this way pass through the apertures 34a of the plate 34 on to the mandrels 6. In this manner the fitting of the rings is a speedy, mechanical working operation.

Figure 9:
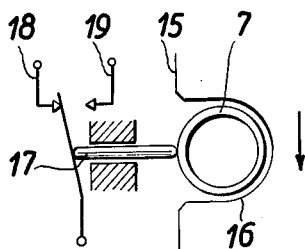

Since it is very important that not one single ring shall be missing, the electrical appliance as per FIG. 9 is used for the purpose of control. Accordingly, there is fitted in a guideway located in the machine's stationary frame, a feeler 17 which, under the action of a spring force, endeavours to move further along towards the right in the position as seen in the figure, i.e. in the direction of the rings 7. When the batten 15 moves in the direction of the arrow seen in FIG. 9, it takes the rings against the mandrels, in which case therefore, one ring must be located in each individual recess 16. For this reason no contact is made at the contact 19 by the feeler in its position as shown in the drawing, where it is lying on top of the ring, and so the indicating lamp fitted for this purpose does not light up. Now, if the ring is missing, the feeler 17 is taken further to the right by the spring force and, at 19 it establishes contact as a result of which the lamp lights up and the machine is brought to a standstill. In the opposite direction therefore, where the batten 15 is moved contrary to the direction of the arrow, the cavities must be empty since, if there were a ring in them, it would be unable to drop on to the mandrel. In this event, with the aid of a switch, the contact 18 of the indicating lamp has to be switched on, the result being that the appliance registers a fault in the event of there being a ring in the cavity.

Assuming the rings to have been brought on to the mandrels, there now follows the job of fitting the cooling fins, to which purpose, over the mandrels 6, the two-part table 35a and 35b is fitted and the cooling fin 1 is placed above the latter's cavity. The recessed member receiving the cooling fin contains recesses 35c, or else it is merely made up of bars arranged next to each other as is shown in the plan view as per FIG. 11. By way of the openings in the cooling fin, the locating mandrels 36 are fitted, and these are pushed down through the openings in the cooling fin 1 and brought into contact with the mandrels 6. At the same time the table 35 is lowered also and the bar-shaped components mentioned go into place between the mandrels 6. The table now leaves the mandrels, its two sections moving apart sideways, and the bushings 37 mounted on the locating mandrels 36, moving downwards, press the fin 1 against the mandrel 6.

Again this is followed by the fitting of the rings in the manner already represented, after which the fitting of the plate (fin) is repeated, and so on, up to the full height of the mandrel 6. This operation is repeated twice in succession, since, as has already been mentioned, the fins are divided, and so two groups of cooling fins are assembled ready for use on the charger (FIG. 2). The working process, which has previously been designated (a) is thus terminated.

The working operation (b) will now be explained in conjunction with the FIGURES 12 to 15. FIGURES 12 and 13 show the tubes, arranged horizontally, in a side and front elevation view respectively, FIGURES 14 and 15 showing the components suitable for the job of temporarily securing the tubes, as has already been mentioned.

On the assembly table 20 are the spacing uprights 21 for fixing the distance at which the tubes shall be spaced apart; this may amount to 60 mm. for example. The tubes 2 are placed in the gaps between the uprights 21; the individual layers of tubes are separated from each other by supporting rods 22 placed in between. The number of tubes to be fitted in this manner corresponds to the total number of tubes intended to be used in the cooling unit. According to the example stated, four rows or layers of tubes are employed. The number of tubes is therefore 160.

The tubes remain in this position without cracking or undergoing excessive bending since they are everywhere supported on the supporting rods 22 and the distance between any two such rods, i.e. the so-called free length, is short, so that any bending stress exerted on the tubes is only slight. But in this position the tubes do not form a suitably secured whole for corresponding further treatment, and consequently, they have to be mutually secured, albeit only temporarily, until the cooling fins have been pushed on. To this end, using a crane, the frame 23 is placed on the system of tubes from above, the attaching components 24 and 25 being suspended therefrom. In the frame 23 are mounted the rotatable spindles 26 on which, in a downwards hanging position, the plates mentioned—25 and 24—are so arranged that they are rotatable together with the spindle 26, though also about their own longitudinal axis as well. On both sides of the plates 24 there are recesses 24a suitable for receiving one tube 2 each, though the plates 25 have no recesses.

When the frame 23 is placed on the tubes, using the crane, the attaching plates are in a position as shown in the middle of FIG. 14, i.e. they are able easily to take up position, from above, between any two tubes. After the frame has been fitted, all the plates 24 and 25 are turned about their longitudinal axis whereupon the tubes are gripped or enclosed by the plates (FIG. 15). Now the supporting rods 22 have to be removed by pulling them out laterally, and with that, the entire system of tubing is secured, and this, in such a manner that the mutual relative position of the tubes of that layer is equal to that which the tubes have to occupy in the cooling unit, and with this, the working operation (b) is completed.

The next operation consists of threading the cooling fins onto the tubes (working operation c). Details of this working process are explained in conjunction with FIGURES 16–20 of which FIG. 16 illustrates the mandrels 6 and the cooling fins 1 located thereon, the mandrels being shown as having been turned horizontally, whereas FIGURES 17–19 show the individual details of the press-fitting. FIG. 20 is a side view of the bundle of tubes placed in the assembling press. The turning of the mandrels and fins or plates located on same into a horizontal position is done in a manner not depicted here, the transporting of the charger to the tube system together with the rings and fins located on the trolley being done with the aid of the trolley as seen in FIG. 2, or in any other manner.

Before pressing tight, the tube system complete with frame 23 to which it is secured by plates 24, 25, is taken to the assembly press, lifted up by means of a crane and deposited from the above onto the working table 27 of the press (FIG. 20). The work-table, together with the frame 23 located on top, now encloses the bundle of tubes and constitutes a clamp, this being important for the simple reason that, during the pressing operation, the bundle of tubes sustains a bending stress and, consequently, if the components 23 and 27 were not there to hold the equipment, the latter might become bent out of shape or even break. On the work-table 27 is the rocker 28, the function of which is to raise the finished, horizontal cooling unit and convey it away. The actual cooling unit does not in fact possess the necessary strength to permit of its being lifted by a crane and so it is passed on into the subsequent working operations lying on a rocker support similar to a vehicle chassis. On the top portions, or, after having been turned horizontal, on the free ends of the mandrels 6 there is a conical portion which can be pushed into the tubes 2 so as to enable the cooling fins to be pushed across (FIG. 19). After having been pushed across however, a slight ledge is created which, when the thin and delicate cooling fins are being pushed across, might cause them to sustain damage. For this reason, there is placed into the ends of the tubes, in accordance with FIG. 19, a spacer 29 which is pressed, stopper-like, into the tube end and joins up to the tube with a smooth passage across, this also enabling the mandrel end to penetrate into the spacing piece's conical bore by virtue of the smooth surface.

When, with the aid of the spacers 29, the mandrels 6 have joined up with the tubes lying on the base plate 27 and located in the rocker 28, the job of threading, i.e. pushing the cooling fins across on to the tubes, commences. For this purpose the bell 30 is employed which is represented in side view in FIG. 17 and in plan view in FIG. 18. With its end facing this bell presses against the push-off frame 31. Inside the bell is the bar 32 which projects outside the bell on both sides. On the side facings of the bell there is, in each case, an elongated cut-out portion which enables the bar 32 to execute a movement against the bell. The bar works in conjunction with the hydraulic cylinder 33 with the aid of which the necessary force can be exercised, so as to cause the mandrels 6 to be pressed against the spacers 29. While the parts 2, 29 and 6 are being pressed against each other, the cooling fins and rings are pushed across, for which purpose the bell 30 is pushed forward by the piston located in the hydraulic cylinder 38, the result of this being that the component parts are threaded on.

In the course of the pushing-across operation, the securing plates 24 and 25 have to be removed from the spaces between the tubes as otherwise these plates would hinder the threading-on of the cooling fins and rings located between them. For this reason the plates are first turned about their longitudinal axis so that they take up the position as shown in the middle portion of FIG. 14, i.e. they let go of the tubes, whereupon the spindles 25 are turned and, consequently, the securing and holding plates are turned outwards out of the spaces between the tubes. This turning-out operation is illustrated in the left-hand side of FIG. 14. Naturally, the plates 24 and 25 are only turned on that side of the bundle of tubes at which the pushing-up of the cooling fins is being done; a continued anchorage of the tubes by the plates is still necessary on the remaining portions of the bundle of tubes.

After the mandrels on the charger have been emptied, i.e. when the cooling fins, rings, and securing plates have been taken over on to the tubes 2, the charger is taken away and the next, full one is brought up to the horizontally lying tubes, and its mandrels, again with the aid of spacers 29 as per FIG. 19, are brought into communication with the tubes, whereupon the plate rings as well as the charger's securing plate are pushed across on to the tubes with the aid of a hydraulic press. These operations are continued until such time as the tubes have been filled with cooling fins along their entire length, about 20 chargers being needed for this. At this juncture, the securing plates 24 and 25 are already turned into a horizontal position, i.e. they are inside the frame 23 above the bundle of tubes; these plates are thus already superfluous, though it is still important that the cooling unit shall be held pressed against the base plate 27 by the frame 23. The pushing across of the cooling fins is followed by the fitting of the top endplate, after which the pressing together, i.e. the compression of all the tubes is performed (operation d). For this purpose it is best to proceed in accordance with FIG. 20 in order, when threading-on the cooling fins with the aid of a hydraulic appliance or some other source of power, to achieve the desired pressure, and finally, to make secure the whole cooling unit and maintain the separate components in a compressed state. For this purpose, two end-plates 3 can be fitted using known means of attachment.

Figure 21:
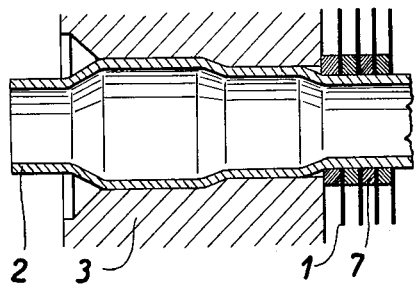
FIG. 21 shows a method of securing the one end of a tube in the end plate.

After the heater unit has been secured, there follows the pressing-in into one end-plate each, on both sides of the unit, as is represented by FIG. 21. From this figure it is easy to see that the end-plate 3 is provided with a drilling which widens towards the outside, and into which the tube, by virtue of its malleability in the cold state, is pressed. After this working operation has been performed at both ends of all the tubes, i.e. at both end-plates, the entire cooling unit forms a rigid whole and it stays in the position created by the pressing operation, from which the means of attachment referred to can be removed.

The ensuing working operation consists of widening the tubes for the purpose of bringing them into close communication with the cooling fins and rings. This working operation no longer comes within the scope of the present invention.

If necessary, instead of the tubes 2, steel rods can be employed which, however, only serve for the purpose of assembly, and whose strength is far greater than that of the tubes. Using these tubes the procedure can be carried out up to the flange-in stage, i.e. all the cooling fins and also the ring fitted between them have to be brought on to the steel rods, in the course of which operation these components have to be pressed together. In this manner the steel bars are loose inside the holes in the fins, i.e. they can be pulled out easily and the tubes pushed thereinto to take their place.

The next stage is the edging-over of the tubes (FIG. 21) and finally the widening of same. The advantage of this variant lies in the fact that, when pushing-on the cooling fins and the rings, the delicate tubes are not damaged or subjected to rough usage since they are pushed on to mounting rods made of steel.

In a further variant, the steel rods are fitted into the tubes as a means of strengthtening them after assembly has been completed, but pulled out again prior to the flange-on operation. The job of pulling the rods out can be combined with the task of widening the tubes, which operation does not however fall under the scope of the present invention either.

In a few cases, the assembly procedure described herein is not an advantageous one even though it may be capable of being carried out successfully, since the job of pushing the separate batches of components on the cooling tubes, as well as the fact that they bear against each other, can give rise to complications. These complications are liable to crop up mainly where a wedging takes place of any of the cooling fins on the cooling tube, as a result of which the cooling tube can become further distorted or misshapen.

For this reason it is of advantage for the assembly to be performed in the manner stated on steel mandrels of equal dimension instead of on cooling tubes, after which the steel mandrels are withdrawn from the compressed cooling unit and the cooling tubes inserted in their place. But here too, when pushing the separate components up in order of sequence, there is the danger of jamming occurring, as a result of which the steel mandrel is obviously not damaged though the aluminum cooling fins might easily be torn.

Figure 22:
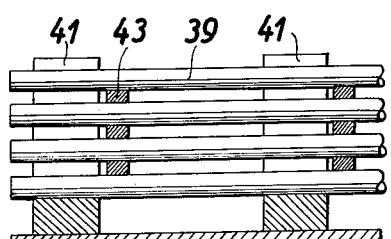
FIGURES 22–23 show a further variant of the tube-fitting equipment as per FIGURES 12–13.
Figure 23:
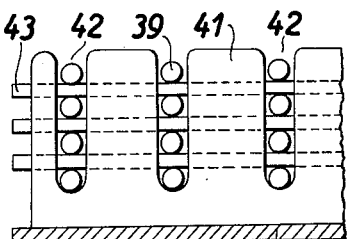
Figure 24:
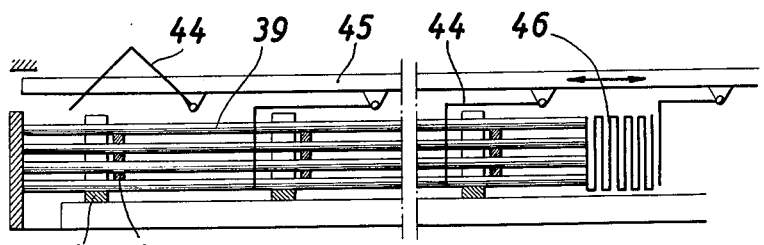
FIGURES 24 and 25 represent a further variant of the assembling machine as per FIGURES 16–18.
Figure 25:
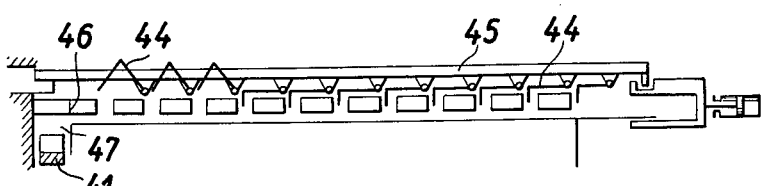

The somewhat complicated construction using rotatable and swivelling tube-holder plates in the frame holding the tubes for assembly may sometimes be regarded as being an adverse one, since any turning or swinging-out of the plates in the course of the assembly operation calls for constant supervision and this entails the use of labour. For this reason it is better to put the steel mandrels 39 (FIGURES 22 and 23) into the grooves 42 of the trough-like blocks 41 fitted on the assembly frame 40, which are constructed so as to correspond to the spacings of the steel mandrels or cooling tubes respectively. The corresponding height clearance of the layers 39 of steel mandrels among themselves is ensured by the rods 43. Depending on the length of the steel mandrels, blocks 41 must be used in a number such that any bending which might occur is of quite insignificant proportions. The mounting frame 40 equipped with steel mandrels in this manner, is placed in the assembling machine. On the assembling machine (FIG. 24) is placed the press-frame 45 equipped with swing-out, angular side plates 44, this press-frame being operated by a hydraulic cylinder in a manner not represented. Into the assembling machine are placed, in the manner already described, the components 46, and they are pushed on into position on the tubes, by the hydraulic pressure appliance, a distance of 1½ times the component's dimension. When fitting the next component 46, the component previously pushed on is also pushed along further by the swing-out slide plate 44. In the return movement, the slide plate 44 swings out and consequently it does not present any obstacle in the path of the threaded-on components. After pushing on therefore, there are two components in the assembling machine with a gap between them corresponding to the thickness of the component (FIG. 25). The slide frame pushes the blocks 41 against the steel mandrels, so that these blocks make their way towards the aperture 47 located at the end of the assembling machine, and, after having come abreast the aperture, they can be withdrawn through same one after the other. The spacing bars 43 can be pulled out through the side opening not represented in the drawing.

In this manner, by the time the first component block 46 has come abreast the opening 47, all the supporter blocks will have been removed from the assembling machine. This state of affairs is represented in FIG. 25.

The moment the first two blocks 46 of components have reached the end walling, the last three slide plates 44 will have finally swung out and they will remain locked in this position. At the next stroke, as a result of the 1½ fold feed motion, three fresh components join the first component and consequently there is no gap left between them any longer.

This procedure is repeated until such time as all components 46 have been pushed up inside the assembling machine without any gap subsisting between them. Then the press-frame 45 is exchanged for a closed pressure cover. The hydraulic press, by way of pressure plates, then presses the blocks of components together by the necessary amount and the components are secured in this position, and, in this secured position the steel mandrels can be withdrawn therefrom and the cooling tubes moved therein to take their place.

In the assembling machine as described, the press-frame 45 is operated by a hydraulic press. The same hydraulic press also presses the cooling fins and the spacers together in the manner already described.

In the interests of mass production, it is better to use two assembling machines. These can be operated in an overlapping manner, thus enabling the two assembling machines to be powered by a common hydraulic press. This hydraulic press can, to advantage, be mounted on a mobile trolley which may also carry the entire hydraulic equipment, the pump, drive motor, and the rest of the hydraulic accessories. The electric motor is plugged in to the mains supply or to the distributing or switch gear respectively, using a flexible cable. The trolley can be taken alternately to the one or the other machine and be anchored on the site by screw-bolts.

In order to safeguard against the circumstance of the hydraulic equipment's being used before the securing bolts have been made completely tight, electrical contacts can be employed which, after the securing screws have been screwed home, can be closed by means of a spring which is compressed by the screw. By means of these electrical contacts, the magnetic circuit of the motor's safety switch is closed. If the securing screws are not properly screwed in, the magnetic circuit at the contacts is broken; in this manner the pump motor cannot be started. An unintentional pressing-in of the spring is prevented by virtue of its own dimensioning, since it can only be compressed by a force which is impossible to be exerted unintentionally without using the screws in the manner prescribed.

The further assembly operation is effected in a manner which has already been described.

The advantage of the equipment as described lies in the fact that the blocks of components 46 are unable to bear against each other while being threaded-on, thereby excluding all possibility of their becoming jammed, as well as reducing the amount of force required to carry out the threading-on operation.

Using the method of assembly as described, it is even possible, in a favourable instance, to dispense with the employment of the steel mandrels.

What we claim is:

1. In a method for the manufacture of heat exchangers consisting of parallel tubes, cooling fins secured perpendicularly thereto, and spacing rings for maintaining mutual spacing between the latter, comprising the steps of temporarily threading the cooling fins and the spacing rings onto vertical mandrels having a length which is a fraction of the length of the tubes in a sequence corresponding to their ultimate position, tilting the mandrels together with the components on them into a horizontal position, temporarily securing the tubes horizontally in their ultimate relative position in a frame by the use of shiftable supports, aligning the mandrels together with the components threaded on same in one and the same line as the tubes, pushing the threaded-on components across onto the tubes, repeating these operations until the whole length of the tubes is filled with the fins and spacing rings, shifting and removing the shiftable supports as the fins and spacing rings are advanced along the tubes, and after completing the threading of the components onto the tubes securing the heat exchanger's assembled constructional components to form a completed heat exchanger.

2. Method as claimed in claim 1 in which the mandrels form an independent group and the cooling fins and spacing rings threaded on said mandrels are pushed across from the individual groups of mandrels in sequence onto the tubes which are pressed into drillings of end plates secured on both sides of the heat exchanger.

References Cited in the file of this patent

UNITED STATES PATENTS

| | | |
|---|---|---|
| 925,446 | Beebe | June 22, 1909 |
| 1,530,438 | Sykes | Mar. 17, 1925 |
| 1,588,174 | Dewald | June 8, 1926 |
| 1,625,029 | Junkers | Apr. 19, 1927 |
| 1,703,527 | Henshall | Feb. 26, 1929 |
| 1,742,414 | Rogers | Jan. 7, 1930 |
| 2,154,855 | Lear | Apr. 18, 1939 |
| 2,211,813 | Franco-Ferreira | Aug. 20, 1940 |
| 2,351,276 | Malhiot | June 13, 1944 |
| 2,359,575 | Norman | Oct. 3, 1944 |
| 2,688,178 | Boyd | Sept. 7, 1954 |
| 2,747,258 | Kramer | May 29, 1956 |
| 2,841,269 | Jenney | July 1, 1958 |
| 2,910,165 | Byington | Oct. 27, 1959 |